June 5, 1923.

S. A. SMITH

TRANSMISSION GEAR

Filed April 13, 1921

Inventor:
Sydney A. Smith,
by Emery, Booth, Janney & Varney
Attys.

Inventor:
Sydney A. Smith,
by Emery, Booth, Janney & Varney
Attys.

Patented June 5, 1923.

1,457,945

UNITED STATES PATENT OFFICE.

SYDNEY A. SMITH, OF BOSTON, MASSACHUSETTS.

TRANSMISSION GEAR.

Application filed April 13, 1921. Serial No. 460,964.

*To all whom it may concern:*

Be it known that I, SYDNEY A. SMITH, a citizen of the United States, and resident of Boston, county of Suffolk, and State of Massachusetts, have invented an Improvement in Transmission Gears, of which the following description, in connection with the accompanying drawings, is a specificaton, like characters on the drawings representing like parts.

This invention relates to reversing gears such as are utilized for the transmission of power from constantly driven, non-reversing engines and the object of the invention is to provide a device of this type of rugged and compact construction and of superior efficiency in operation.

My invention will best be understood by reference to the following description of an illustrative embodiment thereof shown by way of example in the accompanying drawings, wherein:

Fig. 3 is a cross section on the line 3—3 of Fig. 2; and

Figure 2:
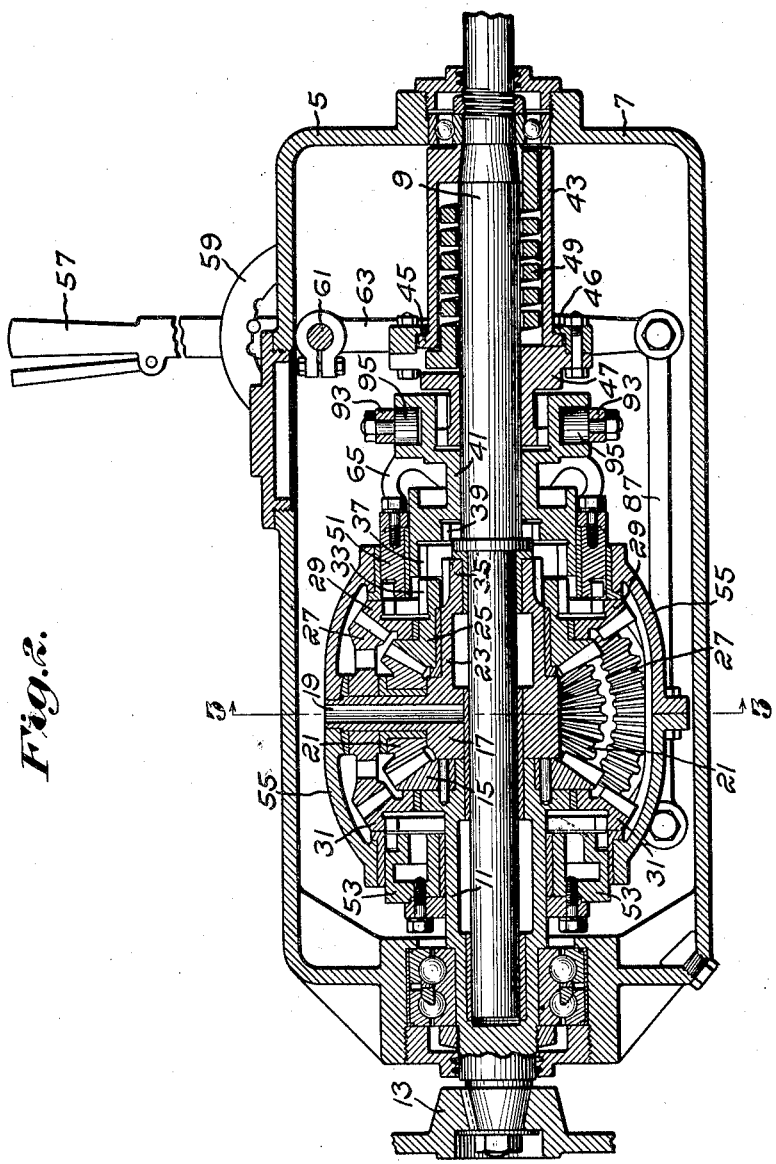
Fig. 2 is a central longitudinal section.
Figure 5:
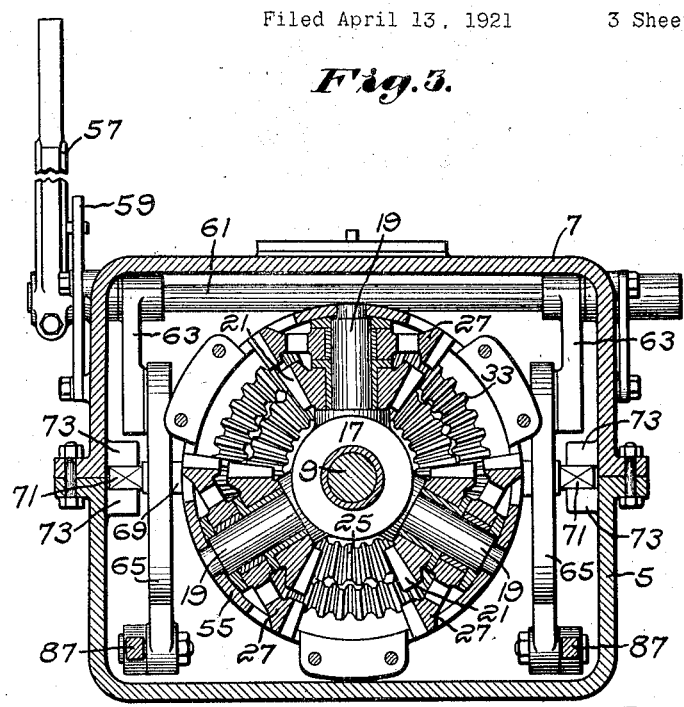

Referring particularly to Fig. 2 of the drawings, the gear as a whole may be enclosed in a suitable casing comprising upper and lower halves 5 and 7 provided, as best shown in Fig. 3, with marginal flanges whereby they may be secured together. Extending in this casing is the driven shaft 9, that is, the shaft which partakes directly of the motion of the engine or other prime mover, this shaft finding a bearing, here shown as a ball bearing, at the forward or right hand end of the housing. The opposite end of the shaft is received in a shaft section 11 (Fig. 2) which takes the form of a sleeve and is journalled in a bearing at the opposite or rear end of the housing and to this shaft section 11 is connected by 13 the mechanism to be driven, such, for example, as a screw propeller.

The transmission shown in the drawings is of the epicyclic bevel type and the elements are supported and held in alignment on the shaft 9. The gear train may include a driven gear 15 (Fig. 2) formed with or secured to the driven shaft 11 and an intermediate pinion carrier or spider 17 having a suitable number of radiating studs or posts 19, herein three as shown in Fig. 3, on which are journalled the bevelled pinions 21. Preferably the pinion carrier has an extended hub portion 23 extending forwardly and on which is loosely mounted the driving gear 25 which, in the example of the invention chosen for purposes of illustration, is not constantly driven by the shaft 9 but is clutched thereto when desired in the manner presently to be described. The gears 25 and 15 and the intermediate pinions 21 are related in the manner of the gears of an epicyclic train.

Herein the studs or posts 19 also receive another set of bevelled pinions 27 which mesh on opposite sides with idler gears 29 and 31, the gear 29 in the present instance being rotatably supported about the hub of gear 25 and the idler gear 31 turning freely around the shaft 11 at the rear of gear 15. The back of the driving gear 25 may be provided with a series of clutch teeth 33 and the hub 23 of the carrier 17, which may extend forwardly beyond the gear 25, may be provided with a similar set of teeth 35. Adapted to cooperate with these clutching surfaces to cause to rotate with the shaft alternatively either the driving gear 25 or both the gear 25 and the carrier 17 are clutch teeth 37 and 39 formed on a sliding clutch box 41 supported on the shaft and adapted to be rotated thereby, preferably in a manner hereinafter to be described.

If the clutch box 41 is moved toward the left, viewing Fig. 2, the teeth 37 and 33 will first engage and cause the driving gear 25 to rotate with the clutch box 41 and with the shaft 9. Lost motion is provided in this connection between the clutching surfaces 37 and 33 so that the clutch box 41 may be shifted still further to the left to cause teeth 39 to engage teeth 35. Both the driving gear 25 and the pinion carrier 17 will then be interlocked with the clutch box 41 and they will rotate as a unit therewith. This is the position of forward control when the driven shaft section 11 is rotating in the same direction as the driving shaft 9.

To connect the clutch box 41 with the shaft 9 I preferably make use of the mechanism illustrated. A sleeve-like member 43 is suitably secured to the shaft 9 to rotate therewith and is provided at its rear end with a flange 45 embraced by a flange 46 on a member 47 which has a toothed hub, the teeth on which slidably engage corresponding teeth on the clutch box 41 whereby the members 41 and 47 are rotatably and telescopically coupled so that the clutch box 41 may be slid forward and back along the shaft in its clutching and unclutching movement without separating it from the member 47. Secured in the member 47 and to the forward end of the sleeve 43 are the ends of a helical spring 49 housed within the sleeve 43. The driving connection between the sleeve 43 and consequently the shaft 9 on the one hand and the member 47 and consequently the clutch box 41 on the other is thus through the spring 49 which forms a yielding connection adapted to take up the shocks when a load is suddenly thrown on the mechanism. As the mechanism picks up the load the spring 49 is wound up and either expanded or contracted, depending on the direction of rotation of main shaft 9, and the turns of the spring are forced either into contact with the sleeve 43 or with shaft 9 in either instance providing a firm driving connection between the power shaft 9 and the driven element 47.

To permit the pinion carrier 17 to be held stationary with respect to the shaft 9, the back of the idler gears 29 and 31 may be provided with suitable clutch teeth adapted to cooperate with similar clutch teeth on two sliding clutch boxes 51 and 53, respectively, these clutch boxes being adapted to move axially of the shaft but being held against rotation, conveniently by supporting them on the housing sections 5 and 7 in a manner hereinafter to be described. Herein the clutch box 53 encircles the shaft section 11 and the clutch box 51 the main clutch box 41. The clutch boxes 51 and 53 may form a support for the plates of the gear housing 55, conveniently formed in two halves as shown.

I will next describe the operation of the transmission gear shown without indicating how the various shiftable parts are moved to bring these parts already described into their proper operative relations, reserving the description of the particular operating mechanism here illustrated for a later place in this description. This operating mechanism, however, it may be stated as this point, is adapted to be worked by a lever handle 57 at the outside of the casings 5 and 7 which may be provided with a suitable positioning segment 59. The handle being in its central position as indicated in Fig. 2, the parts are in the position shown in that figure and the clutch box 41 is out of engagement both with the driving gear 25 and the pinion carrier 17, all the parts of the transmission mechanism are free to turn idly about the shaft 9 and no power is transmitted from that shaft to the driven shaft section 11.

To drive the driven shaft section 11 forward, that is, in the same direction as the driving shaft 9, the lever 57 is moved to the right in Fig. 2 and this, by suitable mechanism such as that hereinafter described, will shift clutch box 41 to the left to the extreme of its movement so that the clutch surfaces 37 and 39 are both engaged with their cooperating clutch surfaces 33 and 35 on the forward driving gear 25 and the pinion carrier 17, respectively, the first mentioned being the first engaged. By this means both the pinion carrier and the driven gear are locked to the shaft as a unit and the pinions 21 neither revolve nor rotate but simply serve in the manner of a clutch to drive the driven gear 15 in the same direction as the shaft.

If we suppose the gear to be used, for example, on a motor boat the inertia of the boat and the resistance of the propeller when the parts are in neutral control tend to hold the driven gear 15 motionless, and the reaction of the pinions 21 and the driving gear 25 is such that there is a tendency to impart rotation to the gear carrier 17 in the same direction as the engine shaft and through the pinions 21 rotating on their studs to the driving gear 25 also in the same direction as the engine shaft. It is thus easy to engage the clutch box 41 with the gear 25 and the carrier 17 into forward driving position with negligible shock.

To pass from forward control to reverse control, that is, to drive the driven member 13 in the opposite direction to the driving shaft 9, the parts pass through the position of neutral control. The handle 57 is thrown back to the left to the position shown in Fig. 2, the clutch box 41 is retracted and all the parts are free. The handle is then thrown further to the left. By this motion two functions are effected. First, the stationary clutch boxes 51 and 53 are moved to lock against rotation the idler gears 29 and 31 and preferably the arrangement is such that gear 31 is first locked and then gear 29. By this means the train consisting of the gears 29 and 31 and the pinions 27 is locked together so that none of the parts thereof can turn one relatively to another, the gears 29 and 31 are held stationary with the stationary clutch boxes and the pinion carrier or spider 17 is likewise held stationary. Thereafter the gear box 41 is moved to the left but not to its extreme position, only the clutch surfaces 37 and 33 engaging to clutch the driving gear 25 to the shaft. The carrier 17 is not so engaged. The drive is then that of an ordinary bevelled transmission, driving gear 25 rotating with the shaft and through the intermediate pinions 21, which are held with the spider so that they do not revolve about the shaft 9, rotating driven gear 15 and consequently the driven shaft section 11 in the opposite direction.

As the parts pass through neutral position the inertia of the driven mechanism as already described tends through the pinions 21 to rotate the driving gear 25 in the same direction as the driving shaft 9 and the driving gear and the pinions are all urged in the same directions as those in which they are operated in the reverse driving position.

Figure 1:
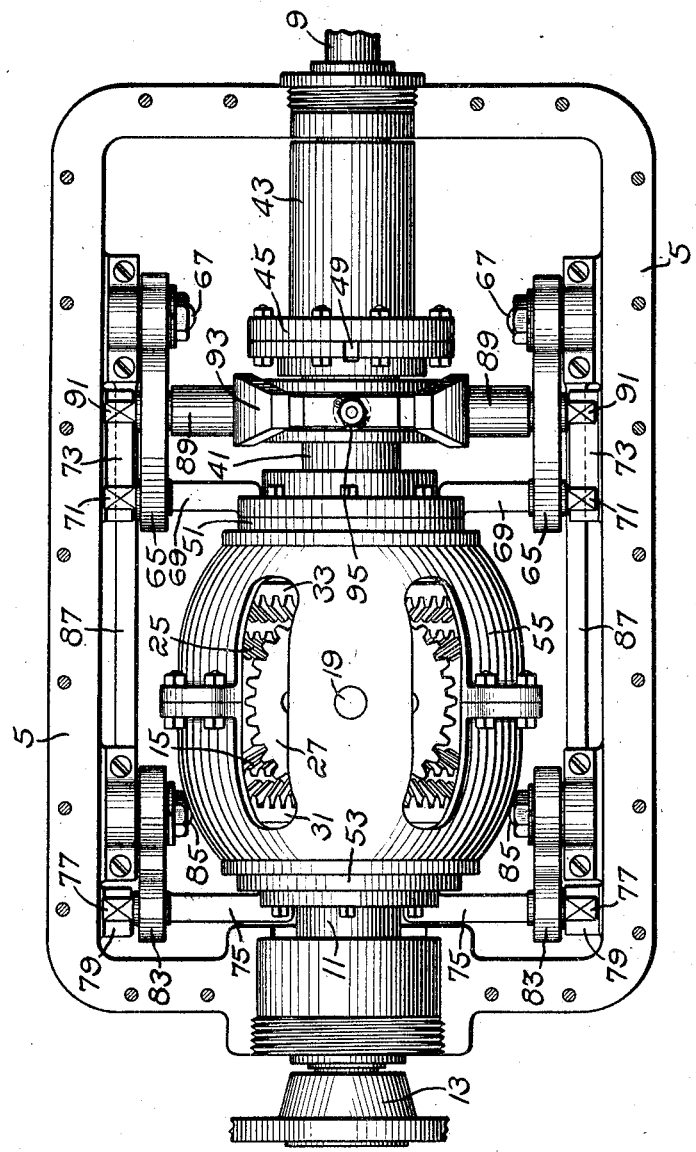
Fig. 1 is a plan view of the gear with the upper portion of the housing removed.

I shall next describe the mechanism here shown whereby the clutch boxes 41, 51 and 53 are given their requisite motions. Referring more particularly to Figs. 1 and 3, the lever 57 may operate a rock shaft 61 which through levers 63 is adapted to rock cam plates 65 disposed at either side of the gear and mounted to turn on studs 67 supported on the interior of the housing.

Figure 4:
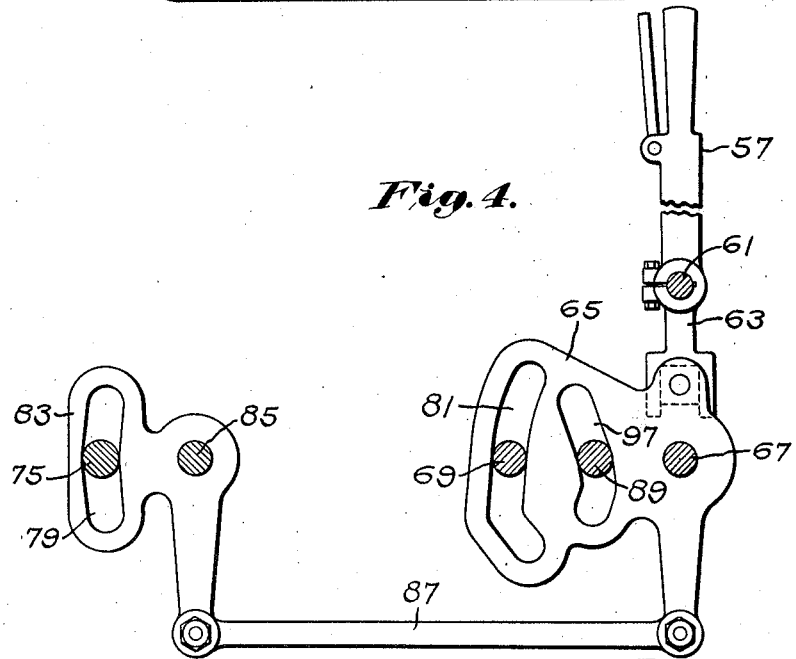
Fig. 4 is a side elevation of one set of operating cams.

The relative position of the parts in Fig. 3 will make it more convenient first to describe the means for shifting the stationary gear boxes 51 and 53. The forward box 51 is provided with laterally extending arms 69 provided with squared ends 71 slidably received between opposed ribs 73 on the lower and upper halves 5 and 7 of the gear casing (see Fig. 3). By this means the clutch box 51 is held against rotation while permitted to have an axial movement relative to the shaft 9, the squared ends 71 sliding between the ribs 73. The rear clutch box 53 is provided with similar arms 75 having squared ends 77 received between similar ribs 79 (see Fig. 1). The cam plate 65 is provided with a suitable cam groove 81 in which work the arms 69. Referring to Fig. 4, this cam groove is provided with a circular upper portion so that when the handle 57 is rocked to the right and the cam plate 65 rotates counterclockwise about the center 67, the arms 69 will not be moved. This is the movement of the handle to forward control. The groove 81 is, however, so shaped that when the handle 57 is rocked to the left the arms 69 will likewise be moved to the left to shift clutch box 51, viewing Fig. 2, and engage it with gear 29. Cam plates 83 pivoted on studs 85 on the sides of the casing (see Fig. 1) receive the arms 75 and they are operated with the cams 65 by means of crank arms and the connecting rods 87. The cam groove of plates 83 is so designed as to have no effect on the arms 75 when the control lever is moved to the position of forward control but when it is moved to the position of rearward control it shifts the arms rearwardly, to the right in the figures, to bring clutch box 53 into engagement with gear 31, this action preferably being timed to follow the engagement of clutch box 51 with gear 29.

I will next describe the means whereby the main clutch box 41 is operated. A cross bar 89 is provided having squared ends 91 received and guided between the flanges 73 on the casing and cross bar 89 is provided with a central yoke or ring 93 on which are mounted (see Fig. 2) inwardly projecting rollers 95 entering a circumferential groove or raceway formed in the clutch box 41. The clutch box 41 can thus rotate within the non-rotatable yoke 93 and the latter may be used to shift the box lengthwise of the shaft. For this purpose the cam plate 65 is provided (see Fig. 4) with a groove 97 receiving the arms 89. Viewing Fig. 4, when the lever 57 is moved to the right for forward control the arms 89 are operated on by the lower part of the groove 97 which is so designed as to shift the clutch box to its extreme limit of movement to the left, viewing Fig. 2, to engage both its clutching surfaces. The upper part of the cam groove is so designed that when the control lever is rocked in the other direction the movement of the arms 89 and consequently of the clutch box is of lesser extent but still in the same direction and only the clutching surfaces 33 and 37 are engaged.

It will be noted that the parts are very simply supported on the casing of the gearing as a whole and that in position of reverse control the pinion carrier or spider is positively locked in its stationary position by strong clutching elements. Nothing in the nature of a frictionally acting brake, the efficiency of which must depend more or less on the power utilized to operate it, is used. The motion of the lever 57 is one merely of control or operation. With the exception of the indispensable gears themselves and the clutches which may be of strong and rugged construction there is nothing to wear and deteriorate in use. The device is so arranged that the elements pass from one operative condition to the other easily and with a minimum of shock and function efficiently in all positions.

Having described in detail the particular form of my invention shown by way of example in the accompanying drawings, what I claim as new and desire to secure by Letters Patent I shall express in the following claims.

Claims:

1. A mechanism of the class described comprising a train of gears including as an intermediate element thereof a rotary gear carrier and means at will to fix the carrier against rotation comprising a gear on the carrier, idle gears meshing therewith and non-rotatable clutch means engageable with said idle gears.

2. A mechanism of the class described comprising an epicyclic train including a driven gear, a driving gear and a rotatable carrier having intermediate gears meshing with said driving and driven gears, auxiliary gears on the carrier, idle gears supported coaxially with the driven and driving gears and meshing with said auxiliary gears, means for causing said carrier to rotate with the driven gear and alternative means for fixing said idle gears against rotation.

3. A mechanism of the class described comprising a shaft, a carrier mounted thereon having inner and outer pinions, gears supported by the shaft and cooperating with the pinions in the manner of epicyclic trains, means for causing one gear to rotate with the shaft and alternatively operating means for either clutching the carrier to rotate with the shaft or fixing the gears of the other train against rotation.

4. A mechanism of the class described comprising a casing, a shaft extending therein, a carrier mounted on the shaft having inner and outer pinions, gears supported by the shaft cooperating with the pinions in the manner of epicyclic trains, means for causing one gear to rotate with the shaft, a clutch movable to cause said carrier to rotate with the shaft, clutch boxes surrounding the shaft and slidably supported by the casing to hold the same against rotation and means for shifting them into engagement with the gears of the other train.

5. A mechanism of the class described comprising a shaft, a spider mounted on the shaft having inner and outer pinions, gears supported by the shaft cooperating with the pinions in the manner of epicyclic trains, a clutch box rotatable with the shaft having teeth adapted to engage first with a gear of one of the trains and on further movement also with the carrier, non-rotatable clutch boxes movable into engagement with the gears of the other train, and an operating lever adapted on movement from mid position in one direction to shift said first mentioned clutch box into engagement with both the parts cooperating therewith and on movement in the other direction to shift it into engagement with the gear only and also to shift said non-rotatable boxes into engagement with their gears.

6. A mechanism of the class described comprising driving and driven gears and an intermediate pinion carrier having pinions meshing with said driving and driven gears, means for causing at will said carrier and driving gear to rotate in unison, a system of idlers connected to said carrier, and clutch means for fixing a portion of the system against movement and serving thereby to lock the system and consequently to hold the carrier from rotation.

7. A mechanism of the class described comprising a shaft, an epicyclic train including a driving gear and a pinion carrier rotatably mounted on the shaft, a clutch box rotatable with the shaft having clutching portions cooperating with driving gear and pinion carrier respectively, an operating handle and means whereby movement of said handle in one direction causes the box to engage with the driving gear and in the other to engage with both driving gear and pinion carrier.

8. A mechanism of the class described comprising a shaft, an epicyclic train mounted thereon including an intermediate pinion carrier having an extended hub and a driving gear encircling the hub and clutch means shiftable along the shaft engageable with said hub and with said gear.

9. A mechanism of the class described comprising a shaft, an epicyclic train mounted thereon including an intermediate pinion carrier having an extended hub and a driving gear encircling the hub and a clutch box shiftable along the shaft having a clutch portion cooperating with said gear and hub respectively, the portion cooperating with said gear having lost motion whereby to permit the gear alone or both gear and hub to be rotatively interlocked with the clutch box.

10. A mechanism of the class described comprising a shaft, an epicyclic train including a driving gear and a pinion carrier rotatably mounted on the shaft, a clutch box slidable on the shaft and having a torsionally resilient connection therewith and means for shifting the clutch box to engage it alternatively with said driving gear or with both said driving gear and said pinion carrier.

11. A mechanism of the class described comprising a shaft, an epicyclic train including a driving gear and a pinion carrier rotatably mounted on the shaft, a clutch box on the shaft comprising two interlocked telescoping members whereby one member may be shifted longitudinally of the shaft, a sleeve secured to the shaft, a torsion spring surrounding the shaft and housed in said sleeve and having its ends secured to the sleeve and clutch box respectively and means for shifting the clutch box to engage it alternatively with said driving gear or with both said driving gear and said pinion carrier.

12. A mechanism of the class described comprising a shaft, a reverse gear mechanism including a driving gear on the shaft, a clutch box on the shaft adapted to interlock with said driving gear and means connecting said box to the shaft comprising a sleeve secured to the shaft, a torsion spring surrounding the shaft and housed in said sleeve and having its ends secured to the sleeve and clutch box respectively whereby the mechanism is adapted to use with prime movers rotating in either direction.

In testimony whereof, I have signed my name to this specification.

SYDNEY A. SMITH.